United States Patent
Kim

(10) Patent No.: US 7,192,068 B1
(45) Date of Patent: Mar. 20, 2007

(54) FRONT BUMPER STRUCTURE FOR VEHICLE

(75) Inventor: Do Hoi Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/300,113

(22) Filed: Dec. 13, 2005

(30) Foreign Application Priority Data

Nov. 17, 2000 (KR) ................. 10-2005-0110152

(51) Int. Cl.
*B60R 19/18* (2006.01)
(52) U.S. Cl. .................................. 293/133; 293/120
(58) Field of Classification Search ............. 293/102, 293/133, 120, 121, 122, 36; 296/187.04, 296/187.09, 193.09
See application file for complete search history.

(56) References Cited

U.S. PATENT DOCUMENTS

| | | | |
|---|---|---|---|
| 5,005,887 A | | 4/1991 | Kelman |
| 6,513,843 B1 * | | 2/2003 | Frederick et al. .............. 293/36 |
| 6,540,275 B1 * | | 4/2003 | Iwamoto et al. ............ 293/120 |
| 6,634,702 B1 * | | 10/2003 | Pleschke et al. ....... 296/187.04 |
| 6,880,882 B2 * | | 4/2005 | Andre et al. ........... 296/193.09 |
| 6,886,872 B2 * | | 5/2005 | Matsumoto et al. ........ 293/120 |
| 6,893,064 B2 * | | 5/2005 | Satou ..................... 296/187.09 |
| 2005/0280268 A1 * | | 12/2005 | Dehn et al. ................. 293/120 |

FOREIGN PATENT DOCUMENTS

| | | |
|---|---|---|
| JP | 06-227333 | 8/1994 |
| JP | 09-011823 | 1/1997 |
| JP | 2002-029338 | 1/2002 |
| JP | 2004-203157 | 7/2004 |
| JP | 2005-047387 | 2/2005 |

\* cited by examiner

*Primary Examiner*—Jason Morrow
(74) *Attorney, Agent, or Firm*—Morgan Lewis & Bockius LLP

(57) ABSTRACT

A front bumper structure for a vehicle, which protects not only the vehicle and passengers in the vehicle when the vehicle collides with another vehicle or object, but also a pedestrian when the vehicle collides with a pedestrian. Since a lower reinforcing member is protruded directly from a bumper cover and at most two carrier-connected portions are formed on the bumper cover, the front bumper structure reduces its weight due to the omission of any stiffener, reduces the production costs due to the reduction in material costs, decreases the man-hours in the manufacturing of the front bumper structure, and increases the safety of the pedestrian due to the use of a horizontal reinforcing rib rigidly supporting the corner portions of the bumper cover.

5 Claims, 3 Drawing Sheets

FIG. 1 [PRIOR ART]
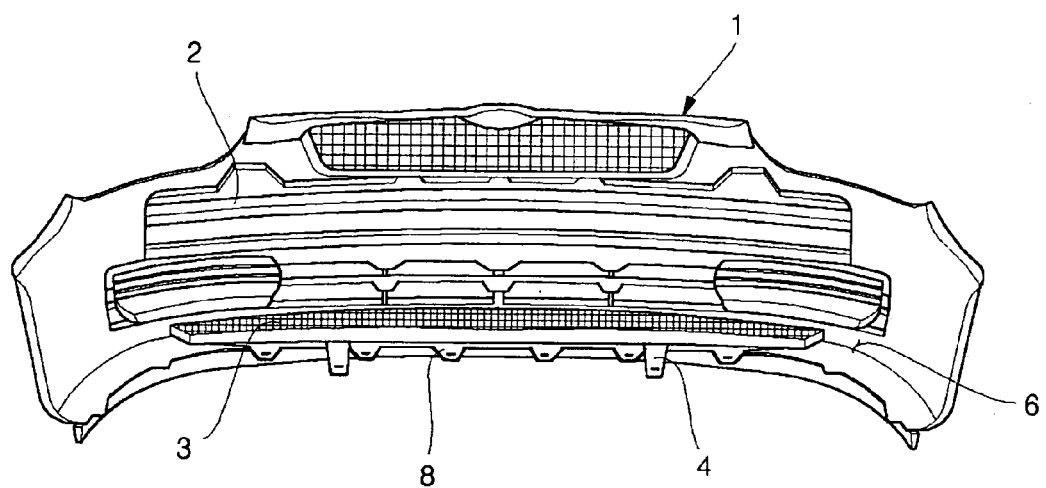
FIG. 2
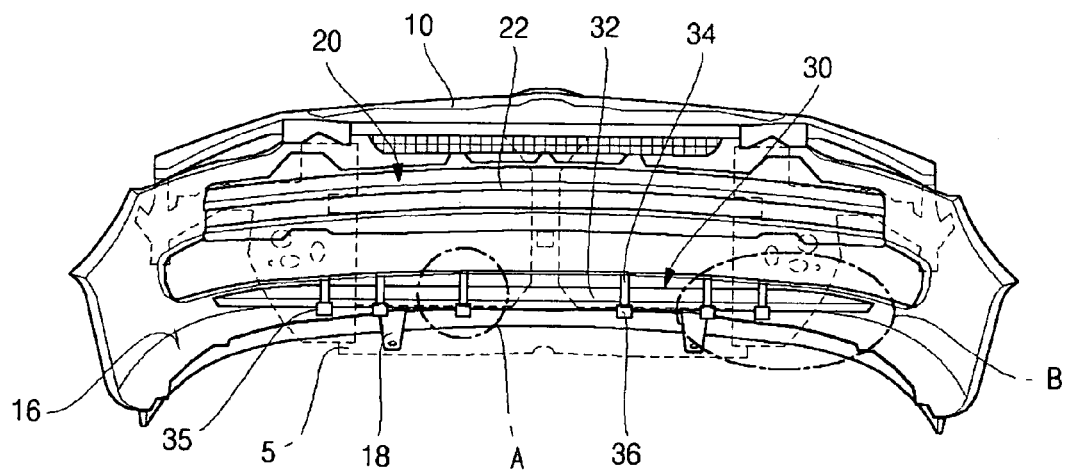

FRONT BUMPER STRUCTURE FOR VEHICLE

CROSS-REFERENCE TO RELATED APPLICATION

This application claims priority to and the benefit of Korean Patent Application 10-2005-0110152 filed in the Korean Intellectual Property Office on Nov. 17, 2005, the entire content of which is incorporated herein by reference.

BACKGROUND OF THE INVENTION

1. Field of the Invention

The present invention relates to a front bumper structure for a vehicle, and more particularly to a front bumper structure of a vehicle, which minimizes damage to the vehicle and protects passengers in the vehicle when the vehicle collides with another vehicle or object, and simultaneously minimizes injury to a pedestrian when the vehicle collides with a pedestrian.

2. Description of the Related Art

Generally, bumpers are respectively installed at front and rear portions of a vehicle, and serve to absorb external impact applied to the vehicle when the vehicle collides with or contacts another vehicle or object, thereby primarily protecting the vehicle. The bumpers are used under the condition that they are fixed to a frame of the vehicle.

Recently, bumper structures are changed such that the bumpers can protect not only a vehicle and passengers but also a pedestrian when the vehicle collides with the pedestrian.

As shown in FIG. 1, a conventional front bumper structure comprises a bumper cover 1 having corner portions 6 at both sides thereof, an upper reinforcing member 2 connected to an upper portion of the inner surface of the bumper cover 1, a lower reinforcing member 3 connected to a lower portion of the inner surface of the bumper cover 1, a plurality of first carrier-connected portions 4 formed on the lower end of the bumper cover 1 for connecting the bumper cover 1 to a FEM carrier (not shown), and a plurality of second carrier-connected portions 8 formed on the lower reinforcing member 3 for connecting the bumper cover 1 to the FEM carrier.

Here, the lower reinforcing member 3 is not formed integrally with the bumper cover 1. That is, the lower reinforcing member 3 is manufactured separately from the bumper cover 1, and is attached to the bumper cover 1.

Since the bumper cover 1 has the curved corner portions 6, a gap is easily formed between each of the corner portions 6 of the bumper cover 1 and the lower reinforcing member 3. Particularly, portions of the lower reinforcing member 3 connected to the corner portions 6 of the bumper cover 1 have a small thickness, and are insufficient to absorb impact when the corner portions 6 collide with a pedestrian, thereby threatening the safety of the pedestrian.

Further, when the lower reinforcing member 6 is connected to the bumper cover 1, as shown in FIG. 1, the front bumper has an increased weight. Moreover, when the bumper cover 1 is connected to FEM carrier, at least twelve portions of the bumper cover 1 are fixed to the FEM carrier, thereby increasing the man-hours in the manufacturing of the front bumper and the production costs of the front bumper.

SUMMARY OF THE INVENTION

Therefore, the present invention has been made in view of the above problems, and it is an object of the present invention to provide a front bumper structure, in which a lower reinforcing member is protruded directly from a bumper cover and at most two carrier-connected portions are formed on the bumper cover, thereby reducing its weight due to the omission of any stiffener, reducing the production costs due to the reduction in material costs, decreasing the man-hours in the manufacturing of the front bumper structure, and increasing the safety of a pedestrian when the vehicle collides with the pedestrian due to the use of a horizontal reinforcing rib rigidly supporting the corner portions of the bumper cover.

In accordance with the present invention, the above and other objects can be accomplished by the provision of a front bumper structure for a vehicle comprising; a bumper cover comprising an upper protruding portion, a lower protruding portion and corner portions for forming an external casing, and carrier-connected portions formed on the lower end thereof for connecting the bumper cover to a FEM carrier; an upper reinforcing member protruded from the inner surface of the upper protruding portion of the bumper cover for protecting the vehicle when the vehicle collides with another vehicle or object; and a lower reinforcing member protruded from the inner surface of the lower protruding portion of the bumper cover for protecting a pedestrian when the vehicle collides with the pedestrian, and comprising horizontal and vertical reinforcing ribs.

Preferably, the lower reinforcing member may be protruded directly from the lower portion of the bumper cover.

Further, preferably, the lower reinforcing member may comprise one horizontal reinforcing rib and a plurality of vertical reinforcing ribs.

Moreover, preferably, an adhesive may be applied to front surfaces of the vertical reinforcing ribs so as to connect the vertical reinforcing ribs to the FEM carrier.

Preferably, the vertical reinforcing ribs may be separated from each other by a uniform distance along the horizontal reinforcing rib so as to uniformly distribute impact.

Further, preferably, each of the vertical reinforcing ribs may comprise a front tip uniformly protruded therefrom so that the sectional dimensions of the front tip are larger than the sectional dimensions of the corresponding one of the vertical reinforcing ribs so as to increase the adhesive strength of the corresponding one of the vertical reinforcing ribs with the FEM carrier.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view of a front bumper structure for a vehicle;

FIG. 2 is a schematic view of a front bumper structure for a vehicle in accordance with the present invention;

DESCRIPTION OF THE PREFERRED EMBODIMENTS

Now, a preferred embodiment of the present invention will be described in detail with reference to the annexed drawings.

Figure 3:
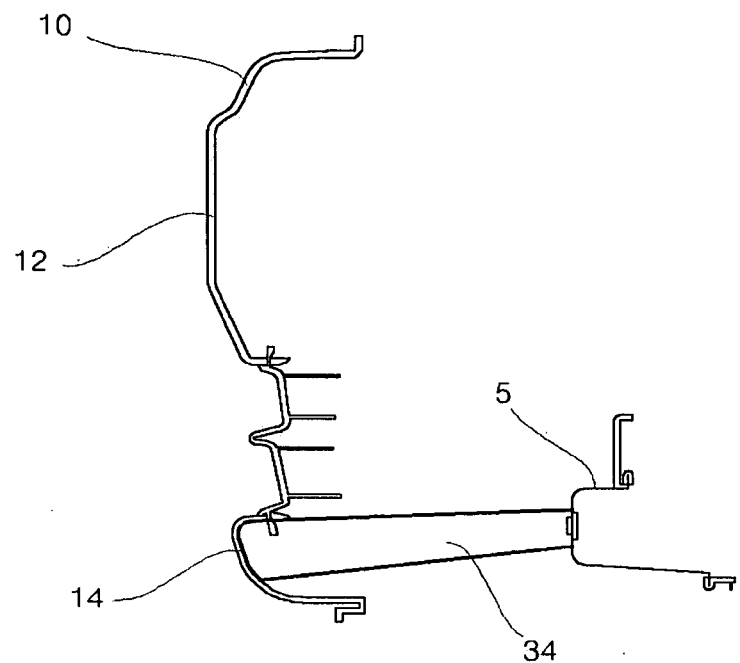
FIG. 3 is a longitudinal sectional view of the front bumper structure in accordance with the present invention.
Figure 4:
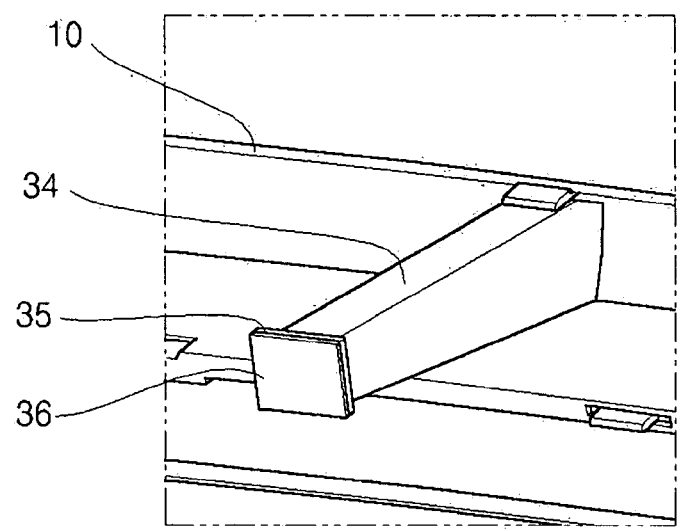
FIG. 4 is an enlarged view of the portion "A" of FIG. 2.
Figure 5:
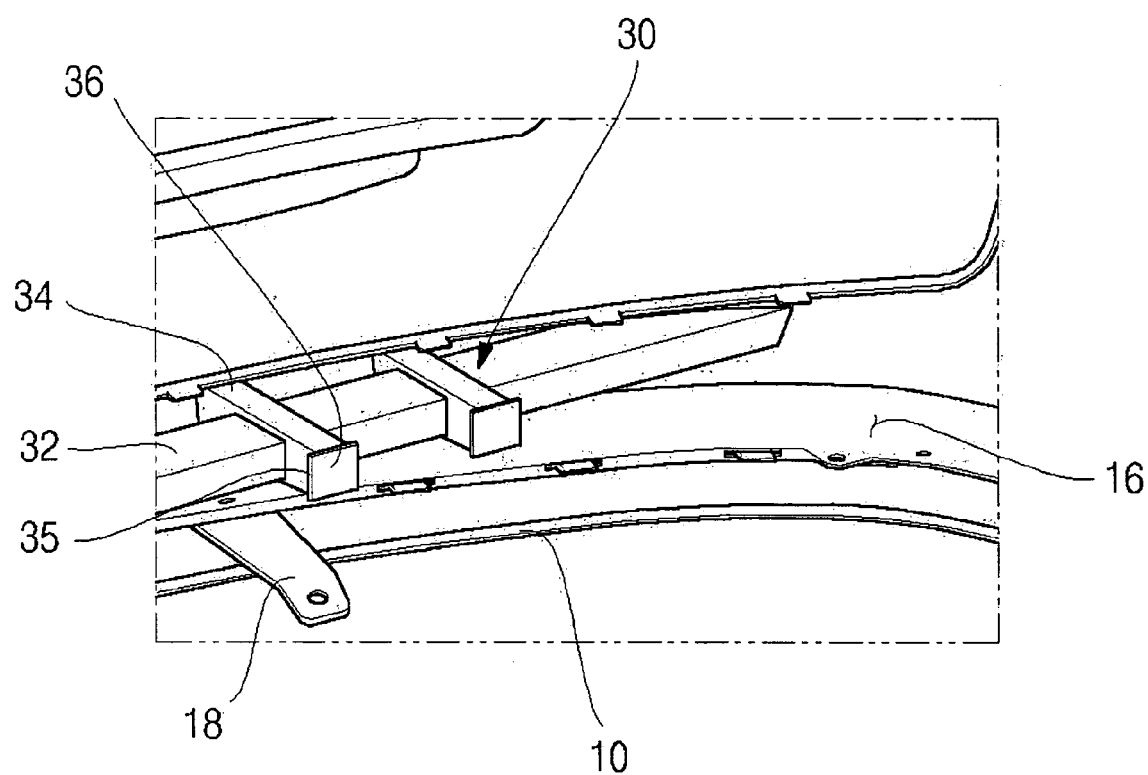
FIG. 5 is an enlarged view of the portion "B" of FIG. 2.

FIG. 2 is a schematic view of a front bumper structure for a vehicle in accordance with the present invention, FIG. 3 is a longitudinal sectional view of the front bumper structure in accordance with the present invention, FIG. 4 is an enlarged view of the portion "A" of FIG. 2, and FIG. 5 is an enlarged view of the portion "B" of FIG. 2.

As shown in FIGS. 2 to 5, the front bumper structure in accordance with the present invention comprises a bumper cover 10, an upper reinforcing member 20, and a lower reinforcing member 30.

Here, the bumper cover 10, the upper reinforcing member 20 and the lower reinforcing member 30 are integrally formed by a single injection molding process using a thermoplastic material, thereby forming an integral front bumper structure.

The bumper cover 10 comprises an upper protruding portion 12, which first contacts another vehicle when the vehicle having the front bumper structure of the present invention collides with another vehicle and thus absorbs impact applied to the bumper cover 10 so as to protect the vehicle and passengers in the vehicle, a lower protruding portion 14, which minimizes impact applied to pedestrian's legs when the vehicle having the front bumper structure of the present invention collides with a pedestrian so as to protect the pedestrian, and curved corner portions 16 formed at both sides of the bumper cover 10 for partially surrounding side portions of the front portion of the vehicle, thereby forming an external casing (with reference to FIGS. 2 and 3).

Carrier-connected portions 18 for installing the bumper cover 10 on a FEM carrier 5 are formed on the lower end of the bumper cover 10. In order to reduce the man-hours in the manufacturing of the front bumper structure, the number of the carrier-connected portions 18 is less than two.

In order to reinforce insufficient connection between the bumper cover 10 and the FEM carrier 5 when the bumper cover 10 is connected to the FEM carrier 5 using at most two carrier-connected portions 18, front tips 35 of vertical reinforcing ribs 34, which will be described later, are connected to the FEM carrier 5 using an adhesive 36.

The upper reinforcing member 20 is installed on the upper protruding portion 12 of the bumper cover 10 such that the upper reinforcing member 20 is protruded directly from the inner surface of the upper protruding portion 12.

The upper reinforcing member 20 serves to protect the vehicle having the front bumper structure of the present invention and passengers in the vehicle when the vehicle collides with another vehicle or object. Identically with a general upper reinforcing member, the upper reinforcing member 20 comprises a plurality of horizontal reinforcing ribs 22.

The lower reinforcing member 30 is installed on the lower protruding portion 14 of the bumper cover 10 such that the lower reinforcing member 30 is protruded directly from the inner surface of the lower protruding portion 14. The lower reinforcing member 30 serves to protect a pedestrian when the vehicle having the front bumper structure of the present invention collides with the pedestrian, and comprises a horizontal reinforcing rib 32 and the vertical reinforcing ribs 34.

Specifically, the lower reinforcing member 30 comprises one horizontal reinforcing rib 32 and a plurality of the vertical reinforcing ribs 34. In order to uniformly distribute impact, the vertical reinforcing ribs 34 are separated from each other by a uniform distance along the horizontal reinforcing rib 32.

In order to absorb impact applied to the corner portions 16 of the bumper cover 10 when a pedestrian collides with the corner portions 16, as shown in FIG. 5, the horizontal reinforcing rib 32 is protruded directly from the corner portions 16 of the bumper cover 10, thereby improving the safety of the corner portions of the bumper cover 10.

That is, the horizontal reinforcing rib 32, which is horizontally extended, is protruded from the corner portions 16, thereby eliminating a gap at each of the corner portions 16 between the inner surface of the bumper cover 10 and the horizontal reinforcing rib 32. Accordingly, when the vehicle having the front bumper structure of the present invention is collides with a pedestrian, a deformed amount of the corner portions 16 by the impact applied thereto is reduced, thus increasing the safety of the pedestrian.

The front tips 35 are uniformly extended from the corresponding vertical reinforcing ribs 34, and the whole surfaces of the front tips 35 directly contact the FEM carrier 5 (with reference to FIG. 2).

The sectional dimensions of each of the front tips 35 are larger than the sectional dimensions of the corresponding one of the vertical reinforcing ribs 34 so that the front tips 35 have a high adhesive strength with the FEM carrier 5 (with reference to FIG. 4).

The adhesive 36 for connecting the vertical reinforcing ribs 34 to the FEM carrier 5 is applied to the front end surfaces of the vertical reinforcing ribs 34 and the whole surfaces of the front tips 35.

Although this embodiment uses a gum paste as the adhesive 36, the adhesive 36 may be any having a high adhesive strength of the vertical reinforcing ribs 34 with the FEM carrier 5.

The lower reinforcing member 30 and the lower protruding portion 14 of the bumper cover 10 reinforced by the lower reinforcing member 30 have a height located below pedestrian's knees, and support portions of pedestrian's calves when the vehicle having the front bumper structure of the present invention collides with a pedestrian, thereby minimizing impact applied to the pedestrian's calves and thus protecting the pedestrian.

As apparent from the above description, a front bumper structure for a vehicle in accordance with the present invention has several effects, as below.

First, the front bumper structure of the present invention does not use any stiffener, thereby reducing the production costs due to the reduction in material costs and reducing its weight. Further, the front bumper structure of the present invention reduces the number of total steps of the manufacturing of the front bumper due to the omission of a step of installing the stiffener, thereby decreasing the man-hours in the manufacturing of the front bumper.

Second, since vertical reinforcing ribs of a lower reinforcing member are supported directly by a FEM carrier, the front bumper structure of the present invention has a high strength.

Third, since a horizontal reinforcing rib of the lower reinforcing member rigidly supports corner portions of a bumper cover, the front bumper structure of the present invention increases the safety of a pedestrian when the vehicle collides with the pedestrian.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A front bumper structure for a vehicle comprising:
   a bumper cover comprising an upper portion, a lower portion, and carrier-connected portions formed on a lower end of the bumper cover for connecting the bumper cover to a FEM carrier;
   an upper reinforcing member protruding from an inner surface of the upper portion of the bumper cover for protecting the vehicle when the vehicle collides with another vehicle or object; and
   a lower reinforcing member protruding from an inner surface of the lower portion of the bumper cover for protecting a pedestrian when the vehicle collides with the pedestrian, and comprising at least one vertical reinforcing rib, and at least one horizontal reinforcing rib protruding directly from a corner portion of the lower portion of the bumper cover.

2. The front bumper structure as set forth in claim 1, wherein the lower reinforcing member comprises one horizontal reinforcing rib and a plurality of vertical reinforcing ribs.

3. The front bumper structure as set forth in claim 1 or 2, wherein an adhesive is applied to front surfaces of the vertical reinforcing ribs so as to connect the vertical reinforcing ribs to the FEM carrier.

4. The front bumper structure as set forth in claim 2, wherein the vertical reinforcing ribs are separated from each other by a uniform distance along the horizontal reinforcing rib so as to uniformly distribute impact.

5. The front bumper structure as set forth in claim 1 or 2, wherein each of the vertical reinforcing ribs comprises a front tip uniformly protruded therefrom so that the sectional dimensions of the front tip are larger than the sectional dimensions of the corresponding one of the vertical reinforcing ribs.

* * * * *